UNITED STATES PATENT OFFICE.

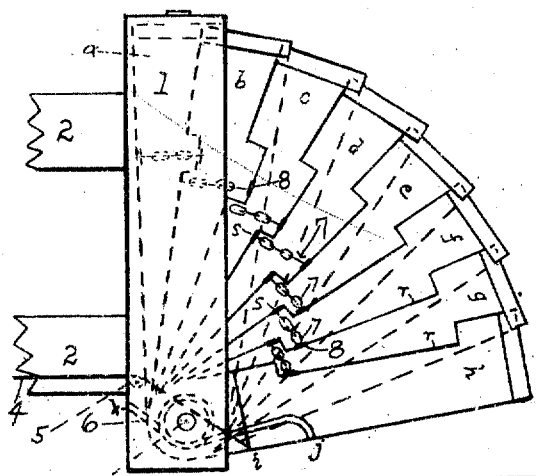
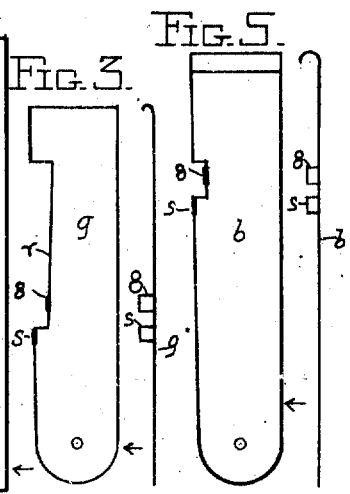
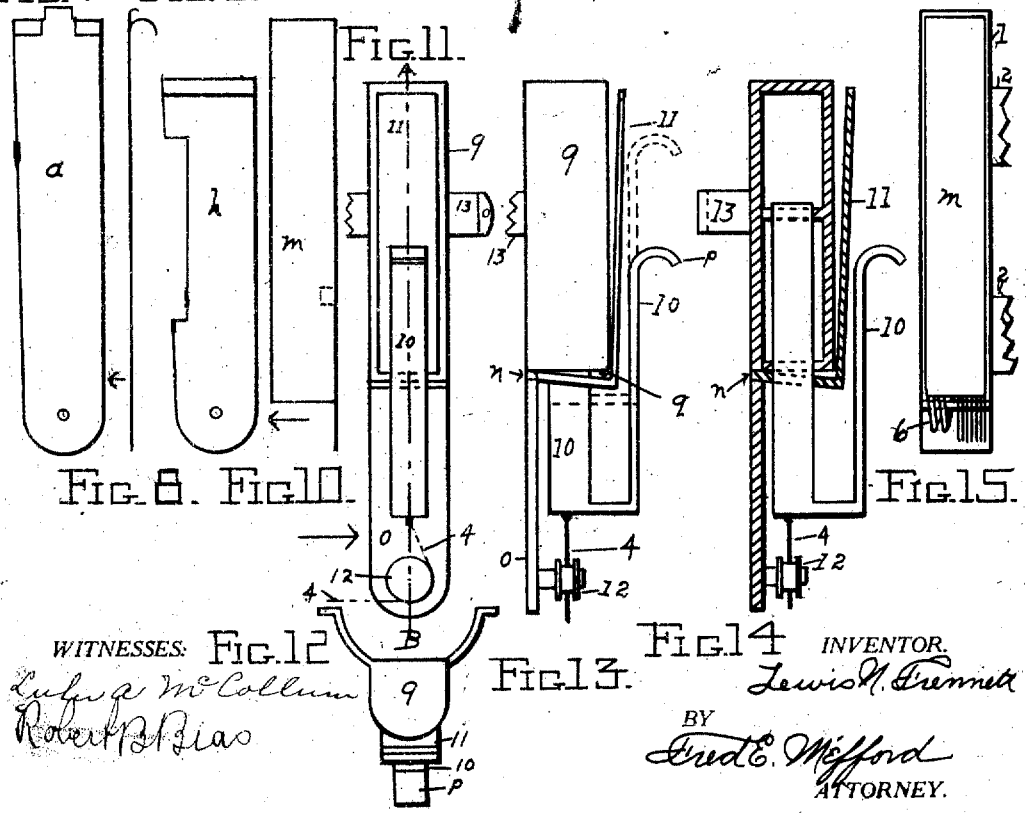

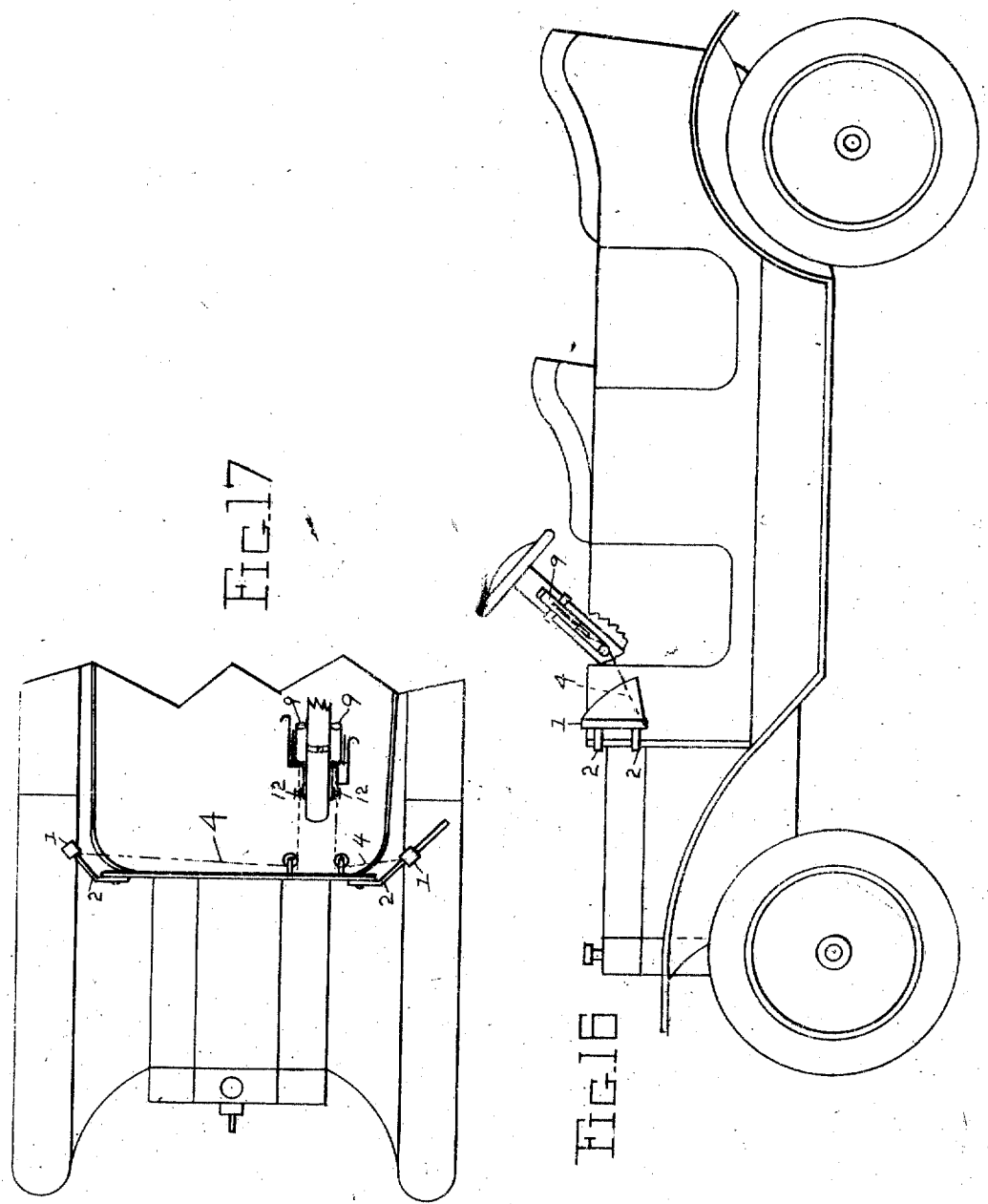

LEWIS N. FRENNETT, OF SAN DIEGO, CALIFORNIA.

SIGNALING APPARATUS.

1,252,563.     Specification of Letters Patent.     Patented Jan. 8, 1918.

Application filed November 8, 1915. Serial No. 60,277.

*To all whom it may concern:*

Be it known that I, LEWIS N. FRENNETT, a citizen of the United States, residing at San Diego, in the county of San Diego and State of California, have invented a new and useful Signaling Apparatus, of which the following is a specification.

My invention relates to signaling devices for use on motor vehicles and the like, to indicate the direction in which the driver intends to turn when approaching an intersecting thoroughfare into which he intends to turn.

The objects of my invention are to provide an indicator which shall be compact and out of sight within a housing when not displayed as a signal; to afford facilities so that the housing may be mounted upon a variety of brackets or supports so that the housing may be attached to any style of motor vehicle or horse drawn vehicle; to provide means to operate the indicator; and to afford facilities so that the operating means may be mounted at any desirable place in the vehicle to suit the convenience of the driver.

With these and other objects in view I illustrate the preferred form of my invention adapted for use on a Ford, Model T, automobile. However I do not wish to be understood as limiting the invention to this particular make of automobiles but it is to be understood that within the scope of what hereinafter is disclosed various changes in the precise embodiment of the invention herein shown may be made without departing from the spirit of the invention, as I intend to adapt it for use on automobiles, auto trucks, horse drawn vehicles, street cars and motor cycles.

Referring to the accompanying drawings Figure 1 is a side elevation of the indicating device and housing as the indicator appears when displayed; Fig. 2 is a side elevation of the device shown in Fig. 1 showing the indicator closed as it is when not displayed as a signal; Fig. 3 is an elevation of the leaf *g;* Fig. 4 is an elevation of Fig. 3 looking in the direction of the arrow; Fig. 5 is an elevation of the leaf *b;* Fig. 6 is an elevation of Fig. 5 looking in the direction of the arrow; Fig. 7 is an elevation of the leaf *a;* Fig. 8 is an elevation of Fig. 7 looking in the direction of the arrow; Fig. 9 is an elevation of the leaf *h;* Fig. 10 is an elevation of Fig. 9 looking in the direction of the arrow; Fig. 11 is an elevation of the operating means, part of one clamp arm being broken away; Fig. 12 is a top plan view of Fig. 11, the clamp arms being shown full; Fig. 13 is an elevation of Fig. 11, looking in the direction of the arrow; the clamp arms being partly broken away; Fig. 14 is a cross section of Fig. 11 on the line A—B; Fig. 15 is an elevation of the device shown in Fig. 1, at right angles thereto looking in the direction of the arrow in Fig. 1, showing the device closed as it appears when not displayed as a signal, the brackets being partly broken away; Fig. 16 is a side elevation of a representation of a Model T Ford automobile, showing the signal attached at the side thereof and the operating means clamped to the steering wheel column and the cable leading to the signal; Fig. 17 is a fragmentary plan view of Fig. 16.

Similar reference characters denote like parts throughout the several views.

Referring to Fig. 1 the numeral 1 denotes the housing of the signaling device; 2, 2 the brackets, partly broken away, by which it is attached to the automobile; *a, b, c, d, e, f, g,* and *h* the leaves or blades of the displaying surface, which swing about the bolt 3. A cable 4 is attached to the blade *h,* at the point *i,* and runs over a pulley 5; a spring 6, is disposed about the bolt 3 and has one end connected to the blade *h,* at the point *j,* and the opposite end disposed against the inside of the housing 1 at the point *k.* The blades are connected together by chains 7 attached to lugs 8 and *s* to hold them from being pulled apart when the surface is displayed and to pull them out of the housing when in the act of making a display. In order to hold the blades with their broad surfaces to each other at all stages of the operation, the ends are bent as shown in Figs. 4, 6, and 8 so that, beginning with the longest, each succeeding blade loop fits into the loop preceding it. This permits the blade ends to move freely in arcs having the same center and to stand parallel when they are drawn into the housing 1.

Beginning with the blade *b,* each notch *r* is wider than the one immediately preceding and each lug 8, located at the bottom of said notches, is nearer the center of rotation than the preceding lug 8. Each lug *s* which is located on the edge of the blade is at a point which swings in the same arc as the adjacent lug 8 on an adjacent blade. A chain 7 connects each pair of lugs s and 8 as before mentioned. The arrangement of the lugs as above set forth and the provision of the different length notches permit of the blades being drawn into the housing by the cable 4 attached to the flange m on the blade h. This flange not only pushes the other blades into the housing but closes the opening in the housing thereby protecting the blades from dirt and rain and giving the housing a better appearance. The brackets 2 may be of any shape or design to suit the automobile or other vehicle to which the device is attached. In the drawings the device is shown mounted at an angle of forty-five degrees with the side of the automobile and I deem this the preferable angle for the reason that pedestrians and motorists as well as the traffic policeman can more readily see the signal when mounted at this angle but any other angle can be used as desire.

Referring to Figs. 11 to 14 inclusive, the numeral 9 denotes the barrel of the operating device mounted upon the steering wheel column in Figs. 16 and 17; 10, the plunger member the cylindrical part of which moves longitudinally within the barrel 9; 11, the locking member, the fulcrum of which is at the point n, Figs. 13 and 14; 12, a pulley mounted on the extension o of the barrel member 9; 13, the arms by which the barrel 9 is clamped upon the steering wheel column.

The invention is operated as follows, the parts being mounted and disposed as shown in the drawings, showing the signal displayed: The plunger 10 is pulled upward by hooking the finger under the hook p on the plunger member 10 which pulls the cable 4 and thereby draws the blade h upward which pushes the other blades into the housing 1. To display the signal, the bent lever 11 is pushed against the barrel 9 which, moving on its fulcrum at n, releases the plunger 10 which is pulled downward by the action of the spring 6 in the housing 1 as it forces the blade out of the housing 1 thereby bringing all of the display surface into view.

It will be seen that the stronger the spring 6 pulls the plunger the better the locking member works for the reason that the hole in the locking member 11 is slightly larger than the plunger and the pull exerts a binding force upon the lever 11 and, that the moment the binding is released the plunger is free. In order to exert a binding force in addition to that exerted by the pull of the spring 6 upon the plunger, a spring q may be disposed against the locking member 11.

Having thus described my invention, what I claim as new and desire to secure by Letters Patent of the United States is—

1. A device of the class described comprising a housing having brackets adapted to be attached to an automobile; a shaft mounted in said housing; a series of blades of different lengths, rotatably mounted on said shaft within said housing having their free ends bent, the bent end of one blade fitting into the bend of the next longer throughout the series, each blade being connected to the next succeeding blade by a chain having its points of connection in the same arc, but in a different arc from the points of connection of any other chain; a spring disposed about said shaft and having one end connected to the shortest blade adapted to force said blade outward; a flange on said shortest blade; a pulley mounted in said housing; pulleys mounted on said automobile; a cable attached to the flange of said shortest blade and running over said pulleys, adapted to pull said blades into said housing; for the purposes set forth.

2. A device of the class described comprising a housing adapted to be attached to an automobile; a shaft within said housing; a series of blades of different lengths rotatably mounted on said shaft, having their free ends bent one upon the other in succession and having notches of different lengths in the corresponding edges thereof; lugs erected from said blades, said notches being adapted to provide room for said lugs; a chain connecting the lug erected from one blade with the lug erected from the edge of the next succeeding blade, said pair of lugs being adapted to move in the same arc; a like connection from the bottom of said last named blade to the next succeeding blade, but adapted to move in a different arc from said first named points of connection and so on throughout the series; a spring wound about said shaft, having one end engaged with the shortest blade and the other end disposed against the back wall of said housing; pulleys mounted on said automobile; a flange on said shortest blade; a cable attached to said flange and extending through a hole in said housing and over said pulleys to the steering wheel column of said automobile; for the purposes set forth.

In testimony that I claim the foregoing as my own, I have hereunto affixed my signature in the presence of two subscribing witnesses.

LEWIS N. FRENNETT.

Witnesses:
AMOS R. EATON,
H. H. HIMEBAUGH.